(12) United States Patent
Meersseman et al.

(10) Patent No.: US 9,322,184 B2
(45) Date of Patent: Apr. 26, 2016

(54) METHODS FOR MANUFACTURING FLOOR PANELS

(71) Applicants: Laurent Meersseman, Kortrijk (BE); Martin Segaert, Ieper (BE); Bernard Thiers, Eine (BE); Benjamin Clement, Waregem (BE); Christophe Maesen, Lichtervelde (BE)

(72) Inventors: Laurent Meersseman, Kortrijk (BE); Martin Segaert, Ieper (BE); Bernard Thiers, Eine (BE); Benjamin Clement, Waregem (BE); Christophe Maesen, Lichtervelde (BE)

(73) Assignee: Flooring Industries Limited, SARL, Bertrange (LU)

( * ) Notice: Subject to any disclaimer, the term of this patent is extended or adjusted under 35 U.S.C. 154(b) by 0 days.

(21) Appl. No.: 14/015,307

(22) Filed: Aug. 30, 2013

(65) Prior Publication Data

US 2014/0020820 A1    Jan. 23, 2014

Related U.S. Application Data

(62) Division of application No. 13/696,769, filed as application No. PCT/IB2011/051884 on Apr. 28, 2011, now Pat. No. 8,549,807.

(30) Foreign Application Priority Data

May 10, 2010   (BE) .................................. 2010/0283

(51) Int. Cl.
*B29C 47/06* (2006.01)
*E04F 15/10* (2006.01)
(Continued)

(52) U.S. Cl.
CPC .............. *E04F 15/107* (2013.01); *B29C 47/065* (2013.01); *B32B 7/12* (2013.01);
(Continued)

(58) Field of Classification Search
CPC .. B29C 65/00; B29C 66/1142; B29C 47/065; C08L 2666/02; C08L 23/06; C08L 2666/06; B44C 1/24; B32B 21/02; B32B 9/00; B32B 2309/02; B32B 2309/04; B32B 2309/105; B32B 2309/12; B32B 2471/00; B32B 37/06; B32B 37/153; B32B 37/226; E04F 15/02038; Y10T 156/1039
USPC ..................................................... 156/244.18
See application file for complete search history.

(56) References Cited

U.S. PATENT DOCUMENTS 3,741,851 A    6/1973   Erb et al.
3,853,685 A   12/1974   Friedrich et al.
(Continued)

FOREIGN PATENT DOCUMENTS

CN   1482166 A   3/2004
CN   2765969 Y   3/2006
(Continued)

OTHER PUBLICATIONS

Database WPI, week 199338, Thomson Scientific, London, GB, AN 1993-300138, XP002621436, Aug. 24, 1993.
(Continued)

*Primary Examiner* — Philip Tucker
*Assistant Examiner* — Vicki Wu
(74) *Attorney, Agent, or Firm* — Capitol City TechLaw (57) ABSTRACT

In a method for manufacturing floor panels that have at least a substrate and a top layer provided on the substrate, the top layer including a thermoplastic layer that is translucent or transparent, the method may involve providing the top layer, including the thermoplastic layer, on the substrate. The method may also involve heating at least the thermoplastic layer, and structuring the thermoplastic layer using a mechanical press element.

10 Claims, 3 Drawing Sheets

(51) Int. Cl.
*B32B 7/12* (2006.01)
*B32B 21/02* (2006.01)
*B32B 37/15* (2006.01)
*B32B 37/22* (2006.01)
*B44C 1/24* (2006.01)
*B44C 5/04* (2006.01)
*B32B 37/06* (2006.01)
*B32B 37/16* (2006.01)
*E04F 15/18* (2006.01)
*E04F 15/02* (2006.01)
*B32B 38/00* (2006.01)

(52) U.S. Cl.
CPC ............... *B32B 21/02* (2013.01); *B32B 37/06* (2013.01); *B32B 37/153* (2013.01); *B32B 37/16* (2013.01); *B32B 37/226* (2013.01); *B44C 1/24* (2013.01); *B44C 5/04* (2013.01); *E04F 15/02038* (2013.01); *E04F 15/10* (2013.01); *E04F 15/18* (2013.01); *B32B 38/145* (2013.01); *B32B 2309/02* (2013.01); *B32B 2309/04* (2013.01); *B32B 2309/105* (2013.01); *B32B 2309/12* (2013.01); *B32B 2310/0825* (2013.01); *B32B 2327/06* (2013.01); *B32B 2471/00* (2013.01); *E04F 2201/0107* (2013.01); *E04F 2201/023* (2013.01); *Y10T 156/10* (2015.01); *Y10T 156/1039* (2015.01); *Y10T 156/1084* (2015.01)

(56) References Cited

U.S. PATENT DOCUMENTS

| | | | |
|---|---|---|---|
| 4,379,198 A * | 4/1983 | Jaeschke et al. | 442/397 |
| 4,400,862 A * | 8/1983 | Ignell | 29/421.1 |
| 4,614,680 A * | 9/1986 | Fry et al. | 428/158 |
| 4,690,434 A * | 9/1987 | Schmidt | 285/31 |
| 4,948,653 A * | 8/1990 | Dinter et al. | 428/172 |
| 5,077,112 A * | 12/1991 | Hensel et al. | 428/76 |
| 5,560,797 A * | 10/1996 | Burt et al. | 156/244.19 |
| 6,444,075 B1 * | 9/2002 | Schneider et al. | 156/242 |
| 8,272,187 B2 * | 9/2012 | Meersseman et al. | 52/745.19 |
| 2004/0191547 A1 | 9/2004 | Oldorff | |
| 2005/0025934 A1 | 2/2005 | Thiers | |
| 2005/0281986 A1 | 12/2005 | Nam | |
| 2006/0008630 A1 | 1/2006 | Thiers et al. | |
| 2006/0032175 A1 | 2/2006 | Chen et al. | |
| 2006/0032177 A1 | 2/2006 | Mariau et al. | |
| 2007/0251188 A1 * | 11/2007 | Moriau et al. | 52/745.19 |
| 2008/0029926 A1 | 2/2008 | Steinwender et al. | |
| 2008/0138560 A1 | 6/2008 | Windmoller | |
| 2009/0061168 A1 | 3/2009 | Kim et al. | |
| 2009/0260307 A1 | 10/2009 | Thiers | |
| 2009/0260313 A1 | 10/2009 | Segaert | |
| 2009/0308001 A1 | 12/2009 | Wu et al. | |
| 2010/0055420 A1 | 3/2010 | Vermeulen | |
| 2010/0083603 A1 | 4/2010 | Goodwin | |
| 2010/0159213 A1 | 6/2010 | Przybylinski et al. | |
| 2010/0215875 A1 | 8/2010 | Yang et al. | |
| 2011/0167744 A1 | 7/2011 | Whispell et al. | |
| 2011/0287237 A1 | 11/2011 | Riebel et al. | |
| 2011/0300392 A1 | 12/2011 | Vermeulen | |
| 2013/0295352 A1 | 11/2013 | Thiers et al. | |

FOREIGN PATENT DOCUMENTS

| | | |
|---|---|---|
| CN | 201339298 Y | 11/2009 |
| CN | 101487336 B | 10/2010 |
| CN | 101613503 B | 5/2011 |
| CN | 101698749 B | 10/2011 |
| DE | 254920 A * | 3/1988 |
| DE | 19944399 A1 | 4/2001 |
| DE | 202005019427 U1 | 5/2006 |
| EP | 1247641 A1 | 10/2002 |
| EP | 1290290 B1 | 3/2003 |
| EP | 1938963 A1 | 7/2008 |
| FR | 2271365 | 12/1975 |
| GB | 2376916 A | 12/2002 |
| JP | 5214803 A | 8/1993 |
| NL | 8000083 A | 8/1981 |
| WO | 9747834 | 12/1997 |
| WO | 0198604 A1 | 12/2001 |
| WO | 2006103565 A2 | 10/2006 |
| WO | 2012001091 A1 | 1/2012 |
| WO | 2012001109 A1 | 1/2012 |

OTHER PUBLICATIONS

Machine translation of DE 202005019427 provided by the European Patent Office at Espacenet at: http://translationportal.epo.org/emtp/translate/?ACTION=description-retrieval&COUNTRY=DE&ENGINE=google&FORMAT=docdb&KIND=U1&LOCALE=en_EP&NUMBER=202005019427&OPS=ops.epo.org&SRCLANG=de&TRGLANG=en.

* cited by examiner

METHODS FOR MANUFACTURING FLOOR PANELS

CROSS REFERENCE TO RELATED APPLICATIONS

This application is a Division of application Ser. No. 13/696,769, filed on Nov. 7, 2012, now U.S. Pat. No. 8,549,807, filed as application No. PCT/IB2011/051884 on Apr. 28, 2011.

BACKGROUND OF THE INVENTION

1. Field

This invention relates to floor panels and methods for manufacturing floor panels.

More particularly, the invention relates to floor panels of the type which is at least composed of a substrate and a top layer provided on this substrate, wherein said top layer comprises a motif. As known, above said motif a transparent or translucent synthetic material layer can be provided, which layer then forms part of said top layer.

In particular, the present invention relates to floor panels of the type which, at two or more opposite edges, comprises coupling means or coupling parts, with which two of such floor panels can be coupled at the respective edges, such that they are locked together in a horizontal direction perpendicular to the respective edge and in the plane of the floor panels, as well as in a vertical direction perpendicular to the plane of the floor panels. Such floor panels can be applied for composing a so-called floating floor covering, wherein the floor panels are interconnected at their edges, however, are lying freely on the underlying floor.

2. Related Art

From WO 97/47834, laminate floor panels are known for forming a floating floor covering. However, laminate floor panels show the disadvantage that they mostly are provided with a moisture-sensitive substrate, namely MDF or HDF (Medium Density Fiberboard or High Density Fiberboard), and that the top layer provided on said substrate, when the floor covering is in use, leads to the development of ticking noises. Mostly, laminate floor panels have a thickness situated between 6 and 12 millimeters, wherein the thickness of the top layer mostly is less than 0.5 millimeters. Moreover, the high density of the substrate material leads to high impact sensitivity.

From EP 1 290 290, it is known to provide laminate floor panels with a structured surface, for example, with a structure imitating wood pores. According to EP 1 290 290, such structure can be provided by means of a press device of the short-cycle type and an associated structured press element or press platen. Herein, the structure can be provided in such a manner that it corresponds to the pattern of the laminate floor panels.

From EP 1 938 963, vinyl-based floor panels are known for forming such floating floor covering. Such vinyl-based floor panels mostly have a thickness of 3 to 5 millimeters and have a high material density. Inherent to these floor panels is their limited bending stiffness and their high deformability. These features lead to problems when the floor panels are applied on an uneven underlying surface. Namely, after a certain period of time the unevennesses of the underlying surface may migrate to the surface of the floor covering. With a local load, for example, underneath the legs of tables or chairs, permanent impressions will occur, which are undesired as well. Such floor panels also lead to problems with the propagation of sound towards underlying rooms.

SUMMARY

The present invention relates to an alternative panel, which in particular is intended as a floor panel for forming a floating floor covering. According to various preferred embodiments of the invention, also a solution is offered for one or more problems with the floor panels of the state of the art.

To this aim, the invention, according to its first independent aspect, relates to a floor panel of the type which comprises at least a substrate and a top layer provided thereon, wherein said top layer comprises a motif, with the characteristic that said substrate substantially consists of a foamed synthetic material layer, which preferably has an average density of more than 300 kilograms per cubic meter. In that a foamed synthetic material layer is applied, a less moisture-sensitive floor panel is obtained than in the case of an MDF or HDF substrate. By foaming, with a comparable amount of synthetic material as with the floor panels of EP 1 938 963, a thicker and stiffer substrate is obtained, such that the risk of the occurrence of migration effects from the underlying layer to the surface of the floor covering can be minimized. This is in particular the case when an average density is applied of more than 300 kilograms per cubic meter. Said substrate preferably has a thickness of more than five millimeters. With such thickness of the substrate, the risk of the occurrence of said migration effects is minimized even further. The minimum thickness of five millimeters also allows that sturdy mechanical coupling means can be formed in one piece with the synthetic material board, for example, in that those can be provided at least partially directly in the synthetic material board as milled profiles.

The preferred minimum average density of the foamed synthetic material board is also advantageous when providing, more particularly milling, the profiles and can result in coupling means offering a strong vertical and/or horizontal locking. With said minimum density, it is avoided that the edges of the synthetic material board are deformed too much. Boards of a lower density namely have a higher risk of pushing up the edges, wherein such pushed-up edges will protrude above the actual board surface. Such effect is undesired. Another advantage of said minimum density is that it results in a better resistance against local loads.

Preferably, said synthetic material board has an average density of 450 to 900 kilograms per cubic meter, preferably 500 to 600 kilograms per cubic meter. It is clear that the above-mentioned advantages of the preferred minimum density are more pronounced with a higher density of the foamed board material. However, too high a density will lead to disadvantageous effects, such as high impact sensitivity and increased sensitivity for possible unevennesses in the underlying surface, whereby sound boxes can be created, which effect an amplification of possible sound developed during the use of the floor covering.

Preferably, said synthetic material board has a local density on one or both flat sides which is higher than in a central layer of the foamed synthetic material board. With such construction, an optimal combination of an average low density and sufficient dimensional stiffness can be obtained. The locally higher density, preferably at least 5 or 10 percent higher than the average density, of course can be situated on the surface itself, as well as at a certain distance underneath the surface of the respective side, however, at a distance from a central layer of the substrate. In the cases where the locally higher density substantially is realized on one of both flat sides only, this preferably relates to the side of the substrate which is situated closest to said top layer. By means of such embodiment, the risk of the occurrence of permanent impressions can be minimized, while the floor panel as a whole has a low weight.

Preferably, said foamed synthetic material board relates to a foamed PVC (polyvinyl chloride) board, or a foamed synthetic material board which substantially consists of another vinyl compound, such as polyvinyl dichloride, polyvinyl butyrate, polyvinyl acetate and the like. As an alternative, as a basis material for the substrate use can also be made of melamine foam, polyurethane or polyisocyanurate.

According to a particular embodiment, said foamed synthetic material board is of the closed cell type, still better it relates to a closed cell foamed PVC board. It is known as such that with foamed synthetic material of the closed cell type the chambers of the foam practically are not interconnected, or at least to a much lesser extent than this is the case with foamed synthetic materials of the open cell type. A foamed synthetic material board of the closed cell type offers a very high stiffness, dimensional stability and water-resistance, with a limited density of, for example, 600 kilograms per cubic meter or less. The limited density offers interesting advantages in logistics, such as in transport. Also, the limited density offers a more ergonomic whole, when 5 to 10 of such floor panels are offered together in a packaging unit. It is clear that the present invention also relates to such packaging unit. The package applied therewith as such preferably consists at least of a cardboard box or open-top box, and shrink film. For example, the packaging materials can be applied which are known as such from WO 2006/103565.

As also mentioned above, an average density of the synthetic material board situated between 500 and 600 kilograms per cubic meter leads to an optimum result of all advantageous and disadvantageous effects. Such density can be realized by means of synthetic materials of the closed cell type, such contrary to the usual hard foams of the open cell type, for example, polyester hard foams or the hard foams known from U.S. Pat. No. 3,853,685, which have a density of 150 kilograms per cubic meter or less and typically are applied for cushions or mattresses.

According to another embodiment, said synthetic material board comprises separate layers which increase the bending stiffness thereof. Such layers preferably are situated at a distance of the center of said synthetic material board, preferably at both sides of this center. Such layers can consist, for example, of a glass fiber cloth or glass fiber fabric. Preferably, this particular embodiment is combined with a locally higher density on one or both flat sides, as also mentioned above.

Preferably, said top layer substantially consists of synthetic material. For example, said top layer can consist substantially of a vinyl compound or of a polyurethane compound. Preferably, said motif herein is formed by a printed synthetic material film, for example, a printed PVC film or a printed PUR (polyurethane) film. However, the invention does not exclude that the pattern can be formed in any other manner, for example, by means of a print performed directly on said substrate, or on a primer layer provided on this substrate. The top layer preferably also includes a transparent or translucent layer based on synthetic material and situated above the motif, which layer is provided as a film, whether or not together with said printed film, or is provided in liquid form and subsequently is hardened on the substrate.

Preferably, the adherence between the top layer and the substrate is obtained in that these two are hardened against each other. For example, a top layer of synthetic material can be hardened on an already foamed synthetic material board or vice versa, or a top layer of synthetic material can be hardened while said synthetic material board is foamed against this hardening top layer or vice versa, or the synthetic material board and at least a portion of the top layer can be extruded together, namely, coextruded. According to a variant, said top layer can also be glued to the substrate, for example, with contact glue. According to another variant, the top layer and the substrate can be welded to each other, for example, in that they both are heated and pressed against each other. Herein, the heating preferably is performed at least on the sides of the top layer and the substrate which have to be adhered to each other. To this aim, for example, heating with infrared radiation can be chosen.

It is clear that the entire layer composition of the floor panel can be obtained by a combination of the possibilities or variants therefor mentioned herein. Namely, the top layer as such can consist of different layers, which each as such are provided on the substrate or another adjoining layer according to any of these possibilities.

Preferably, said top layer has a higher density than said substrate, or at least a density of more than 500 kilograms per cubic meter. By using a top layer of high density, nevertheless a substrate consisting of a foamed synthetic material layer of lower density can obtain a good impact resistance. The density of said top layer can be adapted, for example, by the use of filler materials, such as chalk.

It is noted that within the scope of the invention the foamed synthetic material substrate can be provided with filler materials, such as chalk, wood fiber, sand and the like. In such embodiment, savings on the amount of synthetic material can be obtained.

According to a particular preferred embodiment, said top layer as such is composed of at least a back layer, a motif or pattern provided thereon, and a transparent or translucent wear layer. Said back layer preferably has a thickness which is 45 percent or more of the overall thickness of the top layer. Such back layer preferably consists of a vinyl compound or polyurethane compound, wherein preferably use is made of fillers, such as chalk. The synthetic material applied therewith preferably comprises recycled synthetic material or substantially consists thereof. Preferably, the back layer is made with a higher density than the wear layer. Amongst others, to this aim the application of filler materials in the back layer is of interest. As aforementioned, for the motif or the pattern, use can be made of a printed material sheet, such as a synthetic material film or a print performed directly on the substrate. For said translucent or transparent wear layer, preferably use is made of a vinyl layer or polyurethane layer having a thickness of at least 0.2 millimeters and still better having a thickness of at least 0.3 millimeters. Preferably, this translucent or transparent layer is made not thicker than 1 millimeter. By means of a transparent layer of 0.25 to 0.7 millimeters, a wear resistance can be obtained which is comparable to that of laminate floor panels. The transparent or translucent layer can either be applied as a film, whether or not together with the aforementioned printed film, or can be applied in liquid form and subsequently be hardened on the substrate. Preferably, the transparent or translucent layer has a thickness which corresponds to at least 25 percent of the overall thickness of the top layer. Optionally, the top layer can include a surface layer on the basis of a UV-hardened substance.

It is noted that according to the above particular embodiment, the back layer, the motif and the wear layer can be manufactured according to various possibilities. According to a first possibility, originally they all are made as a synthetic material layer, which, for example, are bonded to each other at least with the use of heat. This bond can be obtained, for example, in a heated press device, such as in a short-cycle press. Subsequently, such composed layer can be adhered to the substrate, for example, by means of an adhesive connection or by means of a welding connection, wherein the substrate and the top layer are melted together. According to a second possibility, at least the back layer and/or the wear layer are provided in liquid or paste-like form on a carrier material, such as glass fiber non-wovens, where they harden. According to this second possibility, the motif then either can be provided by means of a separate printed film, or can be printed directly on the back layer or on the bottom side of the wear layer, for example, by means of offset printing or inkjet printing, preferably by means of UV-based inks or solvent inks.

Preferably, said floor panel has a thickness of 5 to 10 millimeters, wherein said top layer as such has a thickness of 0.5 to 3 millimeters.

As aforementioned, the floor panel of the invention is intended in particular for composing floating floor coverings. To this aim, the floor panel of the invention comprises preferably at least at two opposite edges coupling means, with which two of such floor panels can be locked to each other in horizontal direction as well as in vertical direction. Preferably, herein this relates to coupling means of the type known as such from WO 97/47834. Preferably, said coupling means substantially are made as a tongue-in-groove coupling, which is provided with locking means or locking parts, wherein said tongue-in-groove coupling realizes said vertical locking, whereas said locking means or parts are provided for realizing said locking in horizontal direction.

Preferably, said coupling means substantially are realized in said foamed synthetic material board. Preferably, said coupling means are provided by means of a milling treatment with rotating milling tools. Preferably, the floor panel of the invention relates to a rectangular, either oblong or square, panel, which, at both pairs of opposite sides, is provided with mechanical coupling means.

According to a particular embodiment, the floor panel, at least at two opposite edges, for example, at the long edges of an oblong floor panel, and preferably at all opposite edges, is provided with a recessed edge having, for example, the shape of a chamfer. Such chamfer preferably is limited in depth to the thickness of said transparent or translucent layer. In the case that a deeper recessed edge is intended, the surface of the recessed edge can be provided with a separate decorative covering, or the color and/or the appearance of a possible back layer and/or the substrate can be adapted to the desired effect to be obtained. Said recessed edge preferably is realized by removing a material portion on the respective edges. As an alternative, they can also be realized by means of a deformation exerted at the location of the edge material.

According to an alternative for the above particular embodiment, said recessed edge can also be provided respectively on one edge of a pair of opposite edges.

According to a second independent aspect, the present invention relates to a method for manufacturing panels, wherein these panels comprise at least a substrate and a top layer provided on said substrate, wherein said top layer comprises a thermoplastic, translucent or transparent layer, with the characteristic that said method comprises at least the following steps:
the step of providing said top layer, including said thermoplastic layer, on the substrate;
the step of heating at least said thermoplastic layer; and
the step of structuring said thermoplastic layer at least by means of a mechanical press element.

It is clear that according to the second aspect of the invention, said thermoplastic layer as such, before being heated, already is layer-shaped. Preferably, said heating relates to heating from a temperature of less than 100° C. to a temperature of more than 100° C. Preferably, a temperature of minimum 120° C. and still better minimum 130° C. is obtained. Preferably, the temperature does not rise above 175° C. Preferably, said thermoplastic layer, before being heated, has a temperature of less than 60° C. and still better of les than 40° C. and/or is it not in a paste-like form.

For heating said thermoplastic layer, use can be made of a radiation source, preferably infrared light. As an alternative, also one or more hot-air ovens or hot-air pistols can be applied.

It is clear that the method of the second aspect preferably is applied for realizing the floor panels of the first aspect. Generally, it can also be applied, independently from the substrate material, for floor panels where such top layer, or at least said thermoplastic layer, substantially consists of a vinyl compound or a polyurethane compound. For examples of such top layers, also reference is made to the preferred embodiments of the first aspect, wherein then again not necessarily use is made of a foamed synthetic material board. Instead, use can be made of other synthetic material boards or of wood-based substrates, such as MDF or HDF, or of mineral boards, such as plasterboards. In any case, according to the second aspect, use preferably is made of a substrate having an average density of more than 450 kilograms per cubic meter, with a thickness situated between 5 and 12 millimeters, such that a sufficient dimensional stability is obtained.

Preferably, for the step of structuring, use is made of a press device of the cyclic type, more particular the short-cycle type; in German better known as a Kurztaktpresse. It is not excluded that the press device is applied for the step of heating the thermoplastic layer. Preferably, however, said heating of the thermoplastic layer is performed at least partially and preferably substantially or entirely prior to the press treatment. Instead of a Kurztaktpresse, use can also be made of a multiple-opening press, wherein then a plurality of thermoplastic layers are structured during the same press cycle.

Preferably, said press device is not heated. In other words, the press device preferably is applied at ambient temperature, wherein it is not excluded that the press element, by the contact with the surface of the thermoplastic layer to be structured, increases its temperature. The inventors have found that such method reduces the risk of deformations of the product. Moreover, such method results in a lower risk of the springing-back of the thermoplastic layer, such that sharp structural details can be realized.

When a heated press device is applied, such heated press cycle preferably is followed by a cold press cycle, whether or not performed in the same press device. If it is not performed in the same press device, preferably at least the same structured press element is applied. In this manner, problems with registering between two press elements can be avoided. For example, the thermoplastic layer with the press element provided thereon can be brought from one to the other press device as one stack, without interrupting the contact between the press element and the thermoplastic layer. It is noted that with a heated press cycle, preferably a temperature of more than 100° C. is reached at the surface of the thermoplastic layer, whereas with a cold press cycle preferably a temperature of less than 60° C. is reached at the surface of the thermoplastic layer.

According to a variant, the press element can be provided on the thermoplastic layer before the whole unit of at least the press element and the thermoplastic layer is fed into the press device. In such method, the thermoplastic layer, prior to the press treatment, can be at least partially heated in that the press element is heated. The heating or warming up of the press element can be performed, for example, by applying magnetic induction. In such method, it is possible to exclude a separate heating of the thermoplastic layer. As aforementioned, said press device preferably as such is not or almost not heated, such that a cooling down of the thermoplastic layer is obtained and the risk of springing back of the layer is minimized.

Preferably, a pressure of the press between 20 and 65 bar is applied, wherein a pressure of approximately 40 bar is a good value.

Preferably, pressing is performed during 12 to 60 seconds, still better during 15 to 30 seconds, and such preferably in the case of a press device of the short-cycle type.

Preferably, as the press element a flat press element or a so-called press platen is applied, which is provided with a structure. Such press element can be manufactured, for example, of metal, namely, a steel alloy, a copper alloy or an aluminum alloy, wherein the structure then can be obtained, for example, by means of etching, laser and/or milling treatments. As an alternative, use can also be made of press elements on the basis of synthetic material, for example, on the basis of melamine or Perspex (PMMA).

It is noted that a method wherein a press element on the basis of melamine or another thermo-hardening synthetic material is applied for structuring a thermoplastic layer, as such forms an independent inventive idea of the present patent application. Such press element as such can consist, for example, of one or more material sheets provided with such thermo-hardening synthetic material, such as paper layers, which are consolidated in a press device. The structure of such press element can be realized in any manner, for example, in that this press element as such is consolidated by means of a structured press element of metal, which, by means of etching, laser, and/or milling treatments, is provided with a relief. The advantage of such method is that the metal press element shows almost no wear, whereas the actual press element on the basis of a thermo-hardening synthetic material is cheap and can be considered a disposable tool. It is clear that the press element of this inventive idea preferably relates to a flat press element, for example, a press element for use in a press device of the cyclic type, in a Kurztaktpresse or in a multiple-opening press. The press element of the invention can be applied in an ideal manner in press treatments in which the press device does not have to be heated. In those applications, the reduced heat transfer of the thermo-harder is of no importance. In applications where heat transfer indeed is of importance, possibly additives in the thermo-harder can be used, which improve the heat conduction thereof, such as, for example, the addition of metal particles, carbon particles and the like. The inventors have found that a thermo-harder shows ideal detachment properties when providing a thermoplastic layer with a structure. Moreover, a thermo-harder can be provided with a sharp structure, such that the freedom of design does not have to be restricted.

Preferably, during the step of warming up, at least a pattern or motif, for example, a printed decor film, is situated on the lower side of said thermoplastic layer. Such method allows that in a smooth manner a structure can be obtained, which corresponds to the pattern or the motif. To this aim, a relative positioning between at least the pattern and the press element can be performed. Still better, the step of applying said top layer on the substrate is performed prior to or possibly at the same time with the step of heating up the thermoplastic layer. In such case, said press treatment preferably is performed on a stack comprising at least the substrate and the top layer, including said thermoplastic layer. In the case of a multiple-opening press, then a plurality of such stacks are present in the same press, respectively separated by one or more structured press elements.

It is also noted that said top layer further can also comprise an UV surface coating. Such coating can be intended, for example, for obtaining a resistance against stains, in particular resulting from shoe soles, on the surface of the floor panel. Preferably, such surface coating is applied after said pressing step. Namely, the inventors have found that such surface coating results in an inferior pressing process.

It is clear that the structure, which according to the second aspect is provided in the surface of the thermoplastic layer, relates to a decorative relief, such as, for example, a relief imitating wood. Such relief can consist, for example, of separate impressions, which imitate wood pores and which together form a structure with the appearance of a wood nerve. Preferably, a plurality of such wood pores follow a wood nerve depicted in the motif. Of course, other structures can be realized, too, such as stone structures.

According to a third independent aspect, the present invention also relates to a method for manufacturing the floor panels of the first aspect and/or the preferred embodiments thereof, with the characteristic that this method comprises at least the steps of manufacturing said synthetic material board and of providing said top layer on this synthetic material board, wherein these two steps are performed continuously on the same production line. Preferably, herein said synthetic material board is extruded. The third aspect of the invention provides for an extremely smooth production process for such floor panels.

Preferably, the top layer is at least partially obtained from polyvinyl chloride (PVC) or other vinyl compounds. According to a first possibility for this, it can be started from extruded PVC, which, via heated rollers, is placed as a layer-shaped substance on a carrier material and hardens there. Herein, the carrier material either can comprise said synthetic material board, or can comprise a separate carrier material, such as a glass fiber cloth. Preferably, the carrier material is heated. Possibly, in said vinyl compounds use can be made of plasticizers, such as phthalate plasticizers or isosorbide plasticizers, and/or of waxes, for obtaining a smoother process. According to a second possibility hereof, it can be started from one or more vinyl-containing synthetic material films, which are adhered to the synthetic material board, preferably after supplying heat.

Preferably, on the production line of the third aspect, larger boards consisting of foamed synthetic material layers with top layers are formed, from which afterwards, by means of at least a dividing operation, such as a sawing operation, a plurality of floor panels can be obtained.

Of course, the method of the third aspect can be combined with a method having the characteristics of the second aspect.

According to all aspects, the present invention relates to floor panels or other panels, which as such are rigid and thus as such can not be wound up. Preferably, the final panel shows a thickness of more than 5 millimeters, however, preferably of less than 15 millimeters. A good value for the thickness is 7 to 10 millimeters. Such panels are very suitable for providing mechanical coupling means thereon, which allow to couple to or more such panels at their edges to each other. Preferably, herein use is made of mechanical coupling means, such as of the type known from WO 97/47834. It is clear that also the possible larger boards, from which a plurality of such floor panels are formed, and the substrates as such are rigid. Preferably, the floor panels, boards and substrates are so rigid that they will bend less than 10 centimeters per meter under their own weight.

BRIEF DESCRIPTION OF THE DRAWINGS

With the intention of better showing the characteristics of the invention, hereafter, as an example without any limitative character, some preferred embodiments are described, with reference to the accompanying drawings, wherein.

DESCRIPTION OF NON-LIMITING EMBODIMENTS

Figure 1:
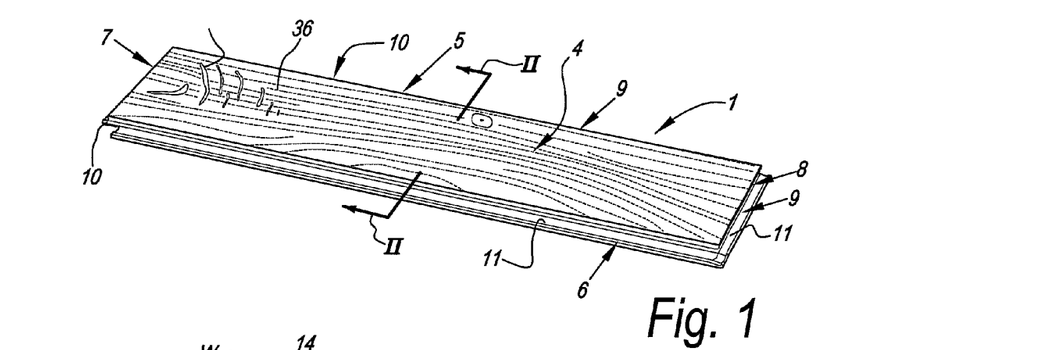
FIG. 1 in perspective represents a floor panel according to a non-limiting embodiment of the invention.

FIG. 1 represents a floor panel 1 for forming a floating floor covering.

Figure 2:
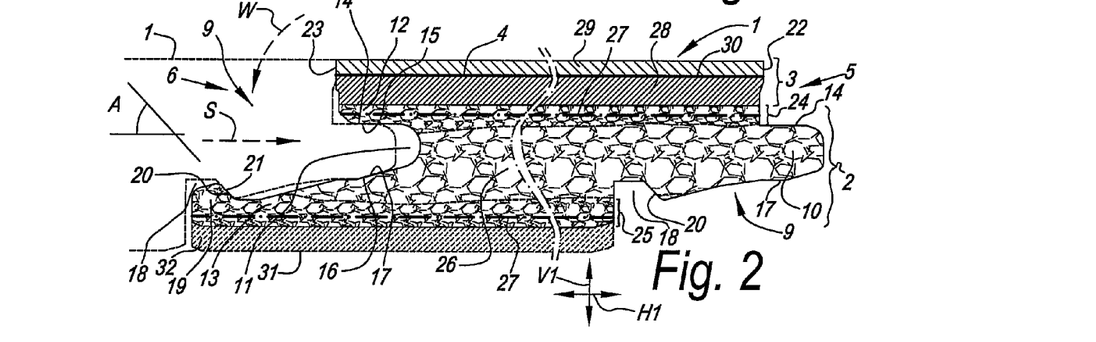
FIG. 2, at a larger scale, represents a cross-section according to the line II-II represented in FIG. 1.

FIG. 2 clearly shows that the floor panel 1 is of the type which comprises at least a substrate 2 and a top layer 3 provided on this substrate 2, wherein the top layer 3 comprises a motif 4, in this case a wood motif.

In the example of FIGS. 1 and 2, this relates to a rectangular floor panel 1, which, at the first pair 5-6 as well as at the second pair 7-8 of opposite edges, is provided with mechanical coupling means 9.

FIG. 2 represents that the coupling means 9 at the first pair 5-6 of opposite edges, namely, the long edges of the floor panel 1, substantially are performed as a tongue 10, a groove 11, respectively. Herein, the groove 11 is flanked by an upper lip 12 and a lower lip 13. When two of such floor panels 1 are coupled to each other at these edges 5-6, the cooperation of the tongue 10 and the groove 11 as such leads to a locking in a vertical direction V1 perpendicular to the plane of the floor panels 1. The cooperation between the tongue 10 and the groove 11 preferably comprises forming one or more pairs 14-15-16-17 of vertically active locking surfaces. In this case, a pair of locking surfaces 14-15 is formed between the upper surface of the tongue 10 and the lower side of the upper lip 12 and a pair 16-17 between the lower side of the tongue 10 and the upper side of the lower lip 13. At least one of said pairs 14-15, and in this case both pairs 14-15-16-17 of vertically active locking surfaces are formed in the example of the particular substrate 2 of the invention. In this manner, a strong locking in vertical direction V1 is obtained.

The coupling means 9 represented here also comprise locking means or locking parts 18-19, which result in a locking in a horizontal direction H1 perpendicular to the coupled edges 5-6 and in the plane of the coupled floor panels 1. In the example, the locking parts 18-19 are formed as an upstanding part 19 on the lower lip 13 and a recess 18 on the lower side of the tongue 10. These locking parts 18-19 are provided in each other when coupling two or more of such floor panels 1. Herein, one or more, preferably two, pairs 20-21-22-23 of horizontally active locking surfaces are created. In the example, one pair of horizontally active locking surfaces 20-21 is situated on said upstanding part 19 and cooperating therewith surface 20 of said recess 18. This pair of horizontal locking surfaces 20-21 is formed from the material of the particular substrate 2 of the invention. The respective locking surfaces 20-21 are oriented at an angle A with the surface of the floor panels 1. This angle A preferably is more than 30 degrees, and still better more than 45 degrees. Angles A of 90 degrees or more are not excluded. The second pair of horizontal locking surfaces 22-23 of the example is situated next to the floor surface, at the height of the location where the top layers 3 of two floor panels, which are coupled to each other, are flanking each other. In this case, this second pair of locking surfaces 22-23 is made substantially vertical. Moreover, this pair of horizontally active locking surfaces 22-23 is substantially and here even exclusively formed of the material of the top layer 3.

Many of the characteristics listed up above and represented in FIGS. 1 and 2 can be applied, within the scope of the invention, broader than in combination with the other characteristics of the example. The following characteristics, each individually or in any combination, can offer interesting advantages:

- the characteristic that the coupling means 9 offer a locking in horizontal direction H1 as well as in vertical direction V1, independently from the fact whether the coupling means 9 are mechanical and/or are performed, whether or not substantially, in the form of a tongue 10 and a groove 11;
- the characteristic that at least one pair of horizontally active locking surfaces 20-21 of the coupling means 9 is realized in the substrate 2 of the invention and/or the characteristic that at least one pair of horizontally active locking surfaces 22-23 of the coupling means 9 is at least partially and preferably entirely realized in the top layer 3;
- the characteristic that one or more pairs 14-15-16-17 of the vertically active locking surfaces are formed at least partially and preferably entirely from the substrate 2;
- the characteristic that the mechanical coupling means 9 consist of milled profiles, which, for at least 70 percent of their circumference, are provided in the substrate 2 of the invention;
- the characteristic that the first pair of opposite edges 5-6 as well as the second pair of opposite edges 7-8 is provided with coupling means;
- the characteristic that the mechanical coupling means 9 allow a coupling by means of a turning movement W along the respective edges 5-6 and/or a horizontal shifting movement S of the edges towards each other and/or a downwardly directed movement of a male coupling part having, for example, a tongue 10, into a female coupling part having, for example, a groove 11;
- the characteristic that the lower lip 13 extends in horizontal direction beyond the upper lip 12;
- the characteristic that in a coupled condition of two of such floor panels 1 a tension force is obtained between the top layers 3 of the respective floor panels 1; herein, the lower lip 13 preferably is in a bent condition;
- the characteristic that the lower lip 13, in a coupled condition, is bent.

The particularity of the present invention, at least according to its first aspect, consists in that said substrate 2 substantially consists of a foamed synthetic material board. In the example, the substrate 2 relates to a foamed PVC board of the closed cell type. The board 2 concerned has an average density of 450 kilograms per cubic meter, however, also has a local density on both flat sides 24-25, namely, a density of 500 kilograms per cubic meter or more, which is higher than the density of a central layer 26 of the synthetic material board 2. Moreover, the substrate 2 comprises separate layers 27, in this case layers of glass fiber, which increase the bending stiffness thereof. In the example, these separate layers 27 are situated on both flat sides 24-25 of the substrate 2.

The top layer 3 of the floor panel 1 of the example is a top layer 3 which substantially consists of synthetic material, namely, of a vinyl compound such as PVC (polyvinyl chloride). This top layer 3 has a higher density than the average density of the substrate 2. The represented top layer 3 as such consists of a back layer 28, a provided thereon motif 4 and a transparent wear layer 29. The back layer 28 is the thickest and densest layer of the top layer 3. It consists of recycled synthetic material, here PVC, which comprises filler material, preferably chalk. For said motif 4, use is made of a printed synthetic material film 30. For example, use can be made of a synthetic material film 30 which is printed by means of solvent inks. Such inks may result in a high-resolution print quality. The synthetic material film 30 as such can consist of PVC or another vinyl compound. For the transparent layer or wear layer 29, use is made of vinyl, such as PVC.

Preferably, said transparent layer 29 is free from filler materials or hard particles, such as aluminum oxide. The inventors have found that a transparent or translucent layer 29 of 0.2 millimeters of vinyl as such is sufficient for obtaining an acceptable wear resistance. Of course, it is not excluded that use should be made of a wear layer 29 which comprises hard particles. However, these have a negative influence on the transparency of such wear layer and lead to accelerated wear of machines which are applied when manufacturing such floor panels 1. When hard particles are applied, preferably a wear layer 29 is used having a thickness of less than 0.3 millimeters, or even less than 0.2 millimeters. Preferably, in such case use is made of hard particles in a concentration of 5 to 20 grams per square meter, wherein 10 grams per square meter represent a good value. Preferably, the applied hard particles have an average grain size between 30 and 120 micrometers, and still better between 50 and 90 micrometers.

As is mentioned in the introduction, however, not represented here, the floor panel 1 can be provided with a surface layer at its surface, for example, on the basis of a UV-hardened substance. Such layer preferably has a thickness of less than 0.1 millimeter, or still better of less than 50 micrometers. It is not excluded that such surface layer includes hard particles, such as aluminum oxide particles, wherein these hard particles preferably have an average grain size of less than 50 micrometers. Possibly, flat particles may be used here.

In dashed line 31, it is represented on FIG. 2 that a backing layer 32 can be provided on the lower side of the floor panel 1. Such backing layer 32 preferably consists of a similar material as the top layer 3, for example, of vinyl, which possibly is provided with filler material. Preferably, the density of said backing layer 32 is lower than the density of said top layer 3, or anyhow at least lower than the back layer 28, which in the example is included in said top layer 3. Preferably, the backing layer 32 consists of open cell foamed PVC or so-called cushion vinyl (cushion vinyl). Such backing layer 32 can be connected to the substrate by similar methods as the top layer 3, namely, either by gluing, by foaming it against the substrate or vice versa, by melting or by extruding or otherwise forming this backing layer 32 together with said synthetic material board 2.

Figure 3:
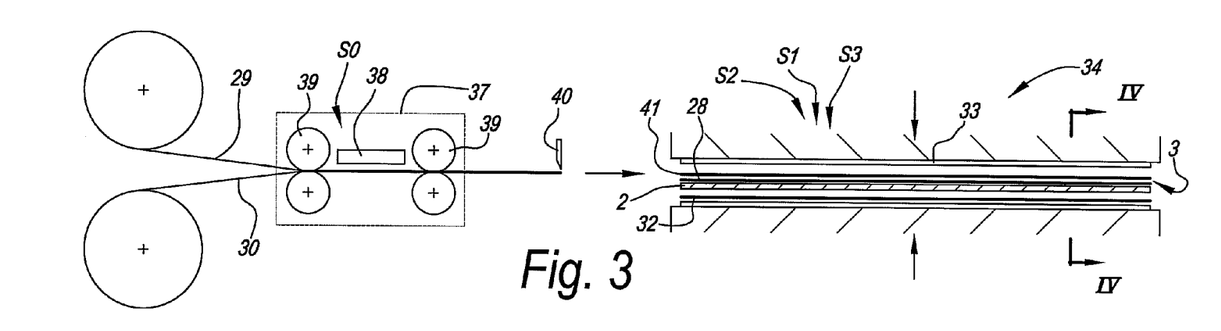
FIG. 3 schematically represents a method for manufacturing floor panels.

FIG. 3 represents a method for manufacturing floor panels 1 in accordance with the embodiment of FIGS. 1 and 2. Herein, larger boards are formed, which show the composition of such floor panel 1 and which, in a step not represented here, are divided into panels showing approximately the final dimensions of such floor panel 1. After this step of dividing, still further operations can be performed on these panels 1, such as forming coupling means or coupling parts 9 at the edges thereof.

The method comprises a step S1 wherein the top layer 3 is provided on the substrate 2, and a step S2 wherein a thermoplastic translucent or transparent layer 29, which forms part of the top layer 3, is structured by means of a mechanical press element 33. In the example of FIG. 3, these two steps S1-S2 are performed simultaneously in a press device 34, for example, as represented here, in a press device 34 of the short-cycle type. As press element 33, a press platen is applied.

Figure 4:
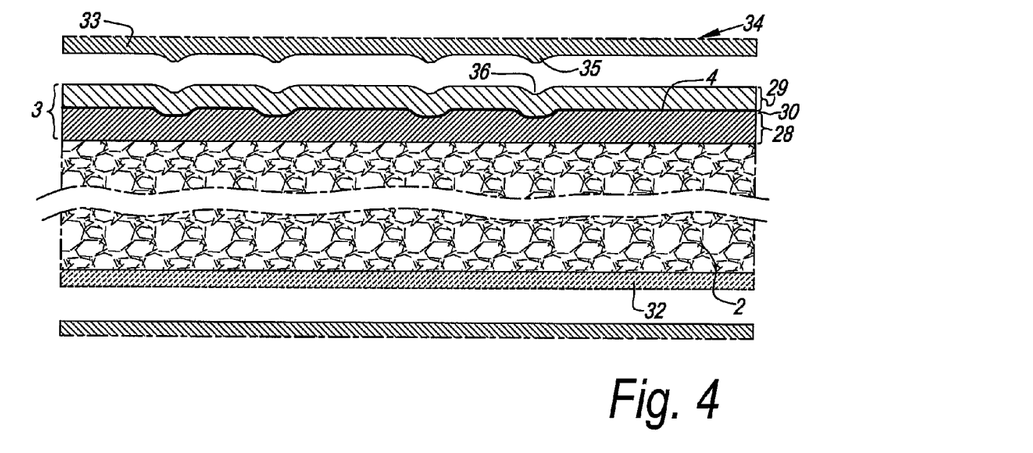
FIG. 4, at a larger scale, represents a cross-section according to the line IV-IV represented in FIG. 3.

FIG. 4 clearly shows that this press platen 33 is provided with a structure 35 which is copied by means of the press treatment at least into thermoplastic transparent or translucent layer 29. In this case, the underlying motif 4 and the back layer 28 are deformed as well. However, it is also possible that the motif 4 and/or the back layer 28 are left undisturbed during the press treatment, or that, in other words, the impressions 36 which are formed in the thermoplastic layer 29 are limited in depth, such that at least the motif 4, or the printed synthetic material film 30, is free from local deformations. Preferably, by means of the step S2 of structuring, impressions 36 are obtained which in location and/or size correspond to the motif 4.

Prior to the press treatment, a step S0 is performed, wherein two thermoplastic layers 29-30 are adhered to each other. Namely, the synthetic material film 30 and the transparent thermoplastic layer 29 are welded or melted to each other by means of a calender device 37. To this aim, use is made of infrared heating 38 and one or more rollers 39. The obtained whole is cut to sheets 41 by means of the cutting tool 40 and, together with the back layer 28, the substrate 2 and a backing layer 32, is brought into the press device 34.

During said press treatment, a third step S3 is performed, too. Herein, the thermoplastic translucent or transparent layer 29 is heated again, by which providing a structure by means of the press element 33 becomes possible. Moreover, by means of this heat an adherence of the thermoplastic layer 29, the synthetic material film 30, the back layer 28, the substrate 2 and the backing layer 32 is obtained. Preferably, the hot press cycle is followed by a cold or cooled press cycle, whether or not taking place in the same press device 34. Such cool cycle prevents an excessive springing back of the realized structure of impressions 36.

According to a not represented variant of FIG. 3, the thermoplastic layer 29 can be sufficiently heated prior to the press treatment, for example, by means of the represented infrared heating 38, such that it can be fed into the press device 37 in warm condition. In such case, a cold press cycle may suffice for structuring the thermoplastic layer 29. The adherence between this thermoplastic layer 29, the back layer 28, the substrate 2 and the possible backing layer 32 then preferably is obtained in another manner than by means of the cold press treatment.

Figure 5:
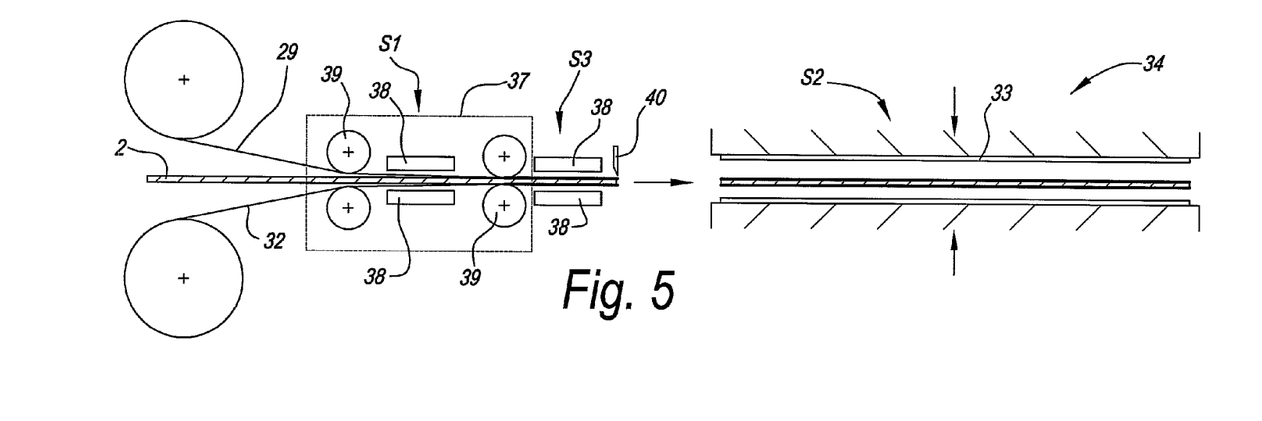
FIGS. 5 to 7, in a view similar to that of FIG. 3, represent variants of a method for manufacturing floor panels.

FIG. 5 represents a variant, wherein the thermoplastic layer 29 is provided on the substrate 2 prior to the step S2 of providing a structure. Schematically, a calender device 37 is represented by which the thermoplastic layer 29 and the possible backing layer 32 are adhered to the substrate 2. It is clear that also a possible printed synthetic material film 30 and/or back layer 28, for example, also by means of such device 37, can be provided on the substrate 2 prior to the step S2 of providing a structure. In this case, the complete layer composition 2-3-32 of the floor panel 1 is obtained prior to the step S2 of providing a structure.

In accordance with the second aspect of the invention, in FIG. 5 the thermoplastic layer 29 is heated, in this case prior to the step S2 of providing a structure, by means of one or more infrared heating units 38. The thermoplastic layer 29, while it already forms part of the connected whole of substrate 2, top layer 3 and possible backing layer 32, is fed in its hot condition into the press device 34, where it is provided with impressions 36 by means of a press element 33. Preferably, here a cold press cycle is used. A similar result can be achieved as represented in FIG. 4.

Figure 6:
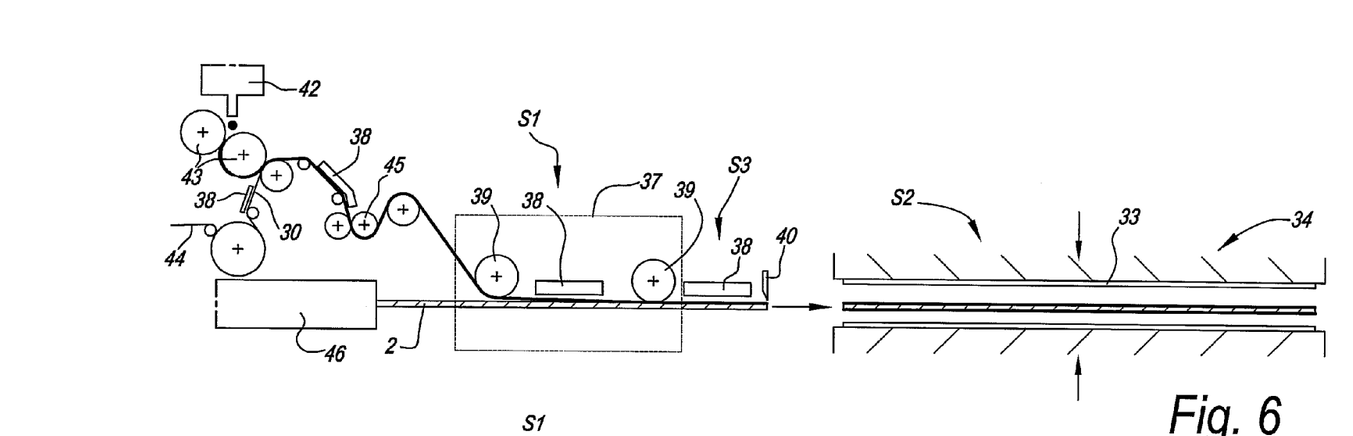

FIG. 6 represents another variant, wherein the thermoplastic transparent or translucent layer 29 is formed in line with the step S1 of providing at least this thermoplastic layer 29 on the substrate 2. To this aim, an extruding machine 42 is installed above a pair of heated rollers 43. By means of the extruding machine 42, amounts of vinyl are provided between said heated rollers 43 and applied in paste-like form on a web-shaped carrier material 44, where it hardens. The carrier material 44 as such can be heated, for example, by means of one or more infrared heating units 38. The carrier material 44 preferably comprises a printed synthetic material film 30, which shows the motif 4 of the final floor panel 1. The extruded vinyl forms a thermoplastic transparent or translucent layer 29 above the motif 4. It is clear that in a similar manner also the back layer 28 and/or the backing layer 32 can be formed against the substrate 2. The step S1 of applying the thermoplastic layer 29 on the substrate 2, the step S3 of heating the thermoplastic layer and the step S2 of providing a structure in this example are performed in a similar manner as in the embodiment of FIG. 5.

It is possible that the thermoplastic layer 29 is provided with a structure at least partially prior to the step S1 of applying this layer 29 on the substrate 2. To this aim, for example, a structured roller 45 can be applied.

In the example of FIG. 6, use is made of a method having the characteristics of the third aspect of the invention. To this aim, the step of manufacturing the synthetic material board 2 and the step S1 of providing the top layer 3 on this synthetic material board 2, or at least providing at least a portion or a partial layer 28-29-30 thereof, for example, the transparent or translucent synthetic material layer 29, are performed continuously and on the same production line. In this case, the synthetic material board 2 is manufactured by means of an extrusion process, which makes use of an extruding machine 46.

Figure 7:
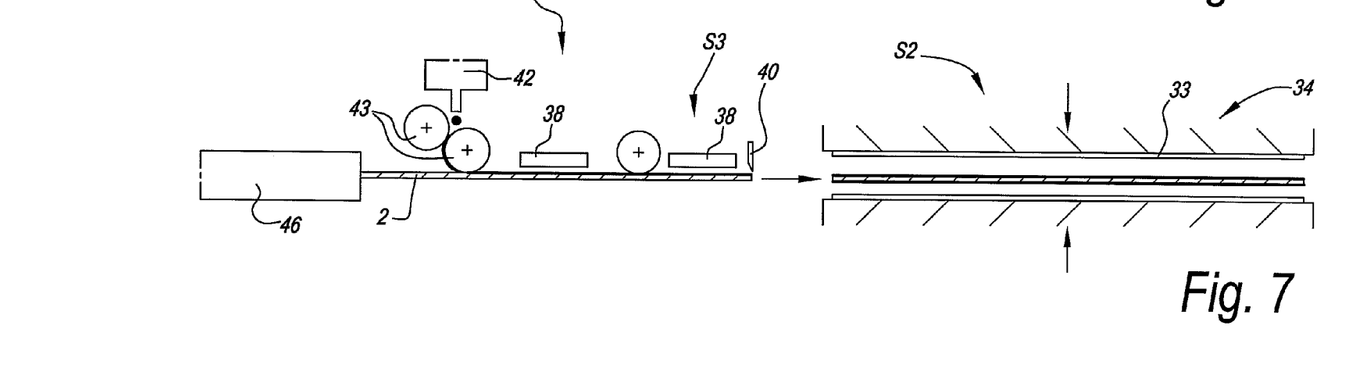

FIG. 7, too, represents an embodiment having, amongst others, the characteristics of the second and the third aspect of the invention. In this case, the vinyl originating from the extruding machine 42 is provided in past-like form directly on the substrate 2, namely, without the intermediary of a carrier material. Of course, in such example already one or more other partial layers 28-29-30 of the top layer 3 can be provided on the substrate 2, such as, for example, a back layer 28 and/or a motif 4, for example, in the form of a printed synthetic material film 30. For the rest, the process represented here is similar to that represented in FIGS. 6, 7 and 8.

According to an alternative, which is not represented here, the substrate 2 and one or more partial layers 28-29-30 of the top layer 3 and/or the backing layer 32 are extruded together via so-called coextrusion. Preferably, in such case at least the back layer 28 and/or the backing layer 32 are extruded together with a synthetic material board 2, preferably a foamed synthetic material layer, such as described by means of the first aspect of the invention.

It is clear that the method illustrated in FIGS. 3 to 7 shows examples of a method having the characteristics of the second aspect of the invention. FIGS. 6 and 7 also are examples of the third aspect of the invention.

According to the embodiments of FIGS. 5, 6 and 7, the substrate 2 is supplied as an endless board material, which is divided prior to the step S2 of providing a structure. However, it is not excluded that in these embodiments, too, boards of limited length are applied, for example, a length approximately corresponding to the length of an integer of the final floor panels, for example, corresponding to one to four times this length. It is also possible that the board material from FIGS. 3, 5, 6 and 7, in endless form, is at least subjected to the step S2 of providing a structure. In such embodiment, preferably a press device is applied of the continuous type. Of course, in such case the cutting device 40 preferably is arranged after the press device.

It is clear that the infrared heating units 38, as mentioned and/or represented in connection with the figures, can be replaced by any other heating apparatus. According to a particular variant, the press element 33 is provided on the thermoplastic layer 29 prior to the step S2 of providing a structure and this press element 33 is heated, wherein the heating of the thermoplastic layer 29 then occurs at least partially by the contact with the press element 33. In the case of a metallic press element 33, the warming up of the press element 33 can be performed by means of magnetic induction.

The present invention is in no way limited to the embodiments described herein above, on the contrary, such methods and floor panels can be realized according to various variants, without leaving the scope of the present invention. Moreover, the panels, instead as floor panels 1, may also be realized as wall panels or ceiling panels or even as furniture panels. Of course, the methods of the invention, mutatis mutandis, can be applied for manufacturing wall panels, ceiling panels, furniture panels or the like.

What is claimed is:

1. A method for manufacturing a floor panel that includes a synthetic material board and a top layer located on top of the synthetic material board, the top layer including a printed motif and a translucent or transparent wear layer, the method comprising:
   manufacturing the synthetic material board with an average density of more than 300 kilograms per cubic meter;
   wherein the synthetic material board includes filler materials selected from the group consisting of chalk, wood fiber, and sand; and
   wherein at least one separate layer is embedded in the synthetic material board, the separate layer being one of a glass fiber cloth and a glass fiber fabric;
   providing the top layer, including the printed motif, on the synthetic material board; and
   mechanically embossing the top layer;
   wherein manufacturing the synthetic material board and providing the top layer are performed continuously on the same production line.

2. The method of claim 1, wherein manufacturing the synthetic material board comprises extruding the synthetic material board.

3. The method of claim 1, wherein providing the top layer comprises placing extruded polyvinyl chloride via heated rollers as a layer-shaped covering on a carrier material.

4. The method of claim 3, wherein the carrier material comprises glass fiber.

5. The method of claim 3, wherein the carrier material comprises the synthetic material board.

6. The method of claim 3, wherein the polyvinyl chloride comprises plasticizers.

7. The method of claim 1, wherein providing the top layer comprises adhering one or more vinyl containing synthetic material films to the synthetic material board.

8. The method of claim 1, wherein a board is formed comprising the synthetic material board and the top layer; and wherein the method further comprises dividing the board into a plurality of floor panels.

9. The method of claim 1, wherein the floor panel is rigid and cannot be wound up.

10. The method of claim 1, further comprising providing mechanical coupling means to the floor panel, the mechanical coupling means allowing the floor panel to be coupled at edges to one or more similar panels.

\* \* \* \* \*